(12) United States Patent
Heath

(10) Patent No.: US 8,260,691 B2
(45) Date of Patent: Sep. 4, 2012

(54) METHOD FOR DETERMINING OPTIMAL INVENTORY LOT SIZES

(76) Inventor: Juan X. Heath, Phoenix, AZ (US)

( * ) Notice: Subject to any disclaimer, the term of this patent is extended or adjusted under 35 U.S.C. 154(b) by 2575 days.

(21) Appl. No.: 11/112,288

(22) Filed: Apr. 21, 2005

(65) Prior Publication Data

US 2005/0240497 A1    Oct. 27, 2005

Related U.S. Application Data

(60) Provisional application No. 60/564,014, filed on Apr. 21, 2004.

(51) Int. Cl.
*G06Q 10/00* (2006.01)
*G06Q 20/00* (2006.01)
(52) U.S. Cl. .......................................... 705/28; 705/22
(58) Field of Classification Search ................ 705/10, 705/22, 28
See application file for complete search history.

(56) References Cited

U.S. PATENT DOCUMENTS

| | | | |
|---|---|---|---|
| 5,375,062 A | 12/1994 | Aoki | |
| 5,615,109 A * | 3/1997 | Eder | 705/7.12 |
| 5,819,232 A | 10/1998 | Shipman | |
| 5,946,662 A * | 8/1999 | Ettl et al. | 705/7.26 |
| 5,953,707 A * | 9/1999 | Huang et al. | 705/10 |
| 5,963,919 A * | 10/1999 | Brinkley et al. | 705/28 |
| 6,021,396 A * | 2/2000 | Ramaswamy et al. | 705/28 |
| 6,078,901 A | 6/2000 | Ching | |
| 6,260,047 B1 | 7/2001 | Fox et al. | |
| 6,341,266 B1 | 1/2002 | Braun | |
| 6,341,269 B1 * | 1/2002 | Dulaney et al. | 705/22 |
| 7,092,929 B1 * | 8/2006 | Dvorak et al. | 705/28 |
| 7,363,259 B2 * | 4/2008 | Baseman et al. | 705/28 |
| 2001/0047293 A1 * | 11/2001 | Waller et al. | 705/10 |
| 2003/0101107 A1 * | 5/2003 | Agarwal et al. | 705/28 |
| 2003/0116567 A1 | 6/2003 | Jozaki | |
| 2003/0144927 A1 | 7/2003 | Kawakami | |
| 2005/0192858 A1 * | 9/2005 | Mueller | 705/10 |

OTHER PUBLICATIONS

: http://www.inventorymanagementreview.org/2005/09/average_invento.html.*
Inflation, taxes, and optimal inventory policies GC Biddle, RK Martin—Journal of Accounting Research, 1985—jstor.org p. 1. Journal of Accounting Research vol. 23 No. 1 Spring 1985 Printed in USA Inflation, Taxes, and Optimal Inventory Policies.*
Optimal ordering policies for perishable inventory-II S Nahmias—Operations Research, 1975—jstor.org p. 1. Operations Research, vol. 23, No. 4, Jul.-Aug. 1975 Optimal Ordering.*
Inventory depletion management C Derman, M Klein—Management Science, 1958—jstor.org p. 1. Inventory Depletion Management* Cyrus Derman and Morton Klein Columbia University . . . 450 p. 2. Inventory Depletion Management 451 . . . .*
http://www.willamette.edu/—fthompso/MgmtCon/Transcost.html.*

* cited by examiner

*Primary Examiner* — Ryan Zeender
*Assistant Examiner* — Dana Amsdell
(74) *Attorney, Agent, or Firm* — Schmeiser, Olsen & Watts, LLP

(57) ABSTRACT

A novel method of optimizing an inventory lot size at least includes: a) determining fixed and variable costs associated with a given lot size; b) determining a sale price associated with the given lot size; c) determining a profit margin (PM) based on the results in a) and b); d) determining an average inventory level (AIL); e) determining a cost of carrying inventory (CCI) associated with the given lot size; f) determining a net present value (NPV) based on a predetermined mathematical relationship between the determined PM, AIL and CCI; g) determining NPV changes (ΔNPV) with incremental changes in lot size; and h) determining an optimal lot size based on the results in g).

16 Claims, 3 Drawing Sheets

METHOD FOR DETERMINING OPTIMAL INVENTORY LOT SIZES

CROSS-REFERENCES TO RELATED APPLICATIONS

This application claims priority to U.S. Provisional Patent Application No. 60/564,014 entitled "Lean Beef," and filed on Apr. 21, 2004.

FIELD OF THE INVENTION

The present invention generally relates to inventory control methods. More particularly, the present invention relates to improving "lean thinking" approaches, and to choosing inventory lot sizes.

DESCRIPTION OF THE RELATED ART

One recent management tool for process improvement that has gained wide acceptance is the Lean Thinking Philosophy. Lean thinking draws on many other time tested decision-making tools such as Just-In-Time (JIT), Six Sigma, Kaizen, and others. However, Lean Thinking approaches can cause inventory managers to make costly decisions. What is lacking in the prior art, but needed, is a compliment to Lean thinking that will determine exactly the right lot size to run in order to maximize profitable returns.

Lean Thinking has several major steps. The first step is creating and mapping out a value stream. The next step is to eliminate the non-value added steps within the value stream. This is followed by making "the remaining, value creating steps flow" (Jones & Womack, 1996). The goal of this effort is to eliminate or greatly reduce running batches of products in favor of single piece operations. Following this step, one works to create a "pull" value chain system rather than a "push" system.

The tools used in Lean thinking have some solid ideas behind them. It is difficult not to see the benefit of eliminating non-value added steps. If a company can merely eliminate non-value added activities, it can greatly improve its financial performance. Making the remaining value added activities flow is in the main, a good idea, as companies do not normally desire to tie up funds in either finished goods or work in process (WIP) inventory. When companies can identify ways to create a "flow" based value stream, they are often able to speed up responsiveness to customer demands. Finally, making a system where the final customer's demand causes a "pull" throughout the supply chain is good because it takes less effort to maintain the movement of goods in response to customer demand.

The principle objective of Lean Thinking is to "make value flow." This means that an organization keeps the portions of the "process" that actually add value from the customer's perspective, and eliminates as much of the rest of the process as possible. These non-value added steps are referred to as "muda" according to Lean Thinking convention. Muda includes all the time a product sits in queue, spends moving from place to place, or waiting for the rest of a batch to complete. In the ideal "Lean" process, the product is processed one piece at a time through the system. In fact, Lean thinking advocates eliminating batch processing altogether. However, that is not always the best financial and operational solution.

Lean Thinking proponents recognize that some waste is unavoidable. Waste is classified in two categories: type one muda; and type two muda. Type one muda includes the portions of the process that create no value, but are necessary within the limits of present technologies (Jones & Womack, 1996). As one goes deeper into the Lean Thinking, one finds that this sort of muda is very broadly defined. In fact, it is so broadly defined that almost anything that is more efficient as a batch process is labeled as type one muda. Type two muda includes the steps in the process that do not add value, and can be done away with immediately (Jones & Womack, 1996). Implied in this concept is the idea that type one muda can be converted to type two muda when technologies change.

Consider as a practical example, a machine shop in the aerospace business, which is a disintegrated company, and buys bar stock, castings, and many other components. Also assume that the company has many suppliers and vendors that are involved in the value stream. Under Lean Thinking, raw material would be received almost immediately after a customer's desire is known. The raw material would move immediately from one step to the next, and it would never stop moving unless the value added step required that the piece remain stationary. After the part had flown through all processes, it would arrive at the customer's doorstep in a very short amount of time. This ideal job flow would be great for any organization. However, the reality is that all the type one muda, or unavoidable waste prevents such a result.

Due to the nature of customer demands, the various requirements for castings and bar stock are highly complex and ever changing. For example, in the company's locale, no single supplier of bar stock may retain every single type of material required for the various aircraft considered. Once material arrives, the documentation and records keeping requirements are intense for safety reasons. Machining usually follows in the process, which is where major improvements have already occurred under Lean Thinking. Set-up times have been drastically reduced from six hours to thirty minutes, for example. Although set-up times have been reduced, they still need to be factored into the process. The next steps include anywhere from one to five vended operations, including such things as deburring, plating, penetrant inspection, broaching, and special polish and grind operations. Ideally, these operations would all be carried out at the same company or, at least, be situated so close to the facility that flowing a single piece at a time is possible. In contrast to this ideal, very seldom does one company posses the expertise necessary to become the sole supplier of all their requirements. The reality is that many operations required for completing a product or service require outside expertise.

Each time a product is sent to an outside vendor, the ability to maintain flow is diminished. For example, a company may each day, send a delivery truck out on one long trip around the metropolitan area where the company is located. If the parts are completed after the truck has left in the morning, they must sit until the following day. The parts certainly do not "flow" while sitting on the dock. The ideal under this situation might be to send out a driver after each and every part is completed, as one lean expert has suggested. That would achieve flow, but would also require a fleet of vehicles and drivers for a rather small amount of product. Further, it would raise the cost of doing business and expose the company to greater risks.

Vendors also have limitations that inhibit flow. For example, plating houses must have certain chemical baths brought up to very specific temperatures and maintain a certain level of purity, while controlling electric currents very precisely. Attempting to plate (just one step in a complex process) one piece at a time would take exorbitant amounts of time and capacity to try to operate a pure flow environment. While it is desirable to achieve a pure flow environment, there is far too much type one muda to allow for efficient single piec& flow in a typical plating house. The same is true for many other processes. Deburr shops, penetrant inspections, broaching and heat-treating businesses all have significant type one muda involved in their processes. Not surprisingly, most of these vendors require a minimum lot charge. The above scenario militates against implementing Lean Thinking to the point of single piece flow.

This, then, is the major weakness in Lean Thinking. It advocates flowing parts and reducing lot sizes down to single piece jobs, yet does not say how to take into account the problems caused by all the type one muda. Type one muda can make it more expensive to reduce lot sizes than to stabilize or even increase them. Lean advocates recommend reducing inventories to the bare bones minimum without using any mathematical guideline to determine just what lot size is the right one. They do suggest that close to zero inventories and single piece flow is optimal. By pursuing this theory, Lean advocates can actually carry more inventories in terms of dollars than would be required for large batches.

As an example, assume that a machine shop makes a vane for a valve body. It runs across six machines that take a total of three hours to set-up, and a combined run time of thirty minutes per part. Then, it goes to an external broach business where the minimum lot charge is $250 plus $10 per part. From there it goes to an external deburr business where the minimum lot charge is $35 plus $3 per part. It then goes to an external penetrant inspection business for a minimum lot fee of $35 plus $1 per part. Lastly, it is stocked and sold to the customer at $200 each. Under the Lean philosophy of single piece flow, one piece would cost $414 ($250 broach lot charge plus $35 deburr lot charge, plus $35 penetrant lot charge, plus $60 set-up labor (3 hrs*$20/hr), plus $10 run {0.5 hr*$20/hr run time}, plus $10 each broach, plus $3 each deburr, plus $1 each penetrant) to make, assuming a mere $20 per hour labor and overhead at the machine shop. If the demand were one piece per month, a company that insisted on single piece flow would lose a minimum of $2568 per year on the part. The average inventory would be one piece costing $414. Now suppose the same company made all twelve at the start of the year. It would cost a total of $678 for the whole lot, or $56.50 per part. On the same sale price of $200 each, the company would earn $1722 per year on the part. The average amount of value tied up in inventory for the second example is $339 due to the fact that the year would start with 12 pieces and lose one piece each month (this does not include the Cost of Carrying Inventory, CCI in the formula). This example shows that in many circumstances, single piece flow is much more costly to the bottom line than running a large lot size.

A pull system means that there is only have one piece in overall inventory (works in process and finished goods), and the process is fast enough that the replacement part can be started and finished prior to the next customer order for the next part. If that is not the case, then parts must be held in works in progress inventory. For example, for the same vane mentioned earlier, suppose it takes three weeks to make the part even after all type two muda has been removed from the system. Now, also suppose that customer orders come in for one piece at the average rate of one per week. Because one cannot start and complete the vane in one week, one must keep other parts at various stages of the process. One part could be one week away from going to finished goods, another at two weeks away, and still a third piece at the start of the three week process. The piece that is one week out has accumulated costs for everything but the penetrant inspection and stock operations. It would tie up $378 dollars in WIP inventory ($414 total minus $35 set-up plus $1 each at penetrant). The piece that is two weeks out has accumulated costs for everything except deburr and penetrant inspection. It would tie up $340 in WIP inventory (the $378 minus $35 set-up plus $3 each at deburr). The last pieces carry no inventory costs because they have not started yet. The total costs for inventory would be $1132 ($414 for the one piece in finished goods plus $718 for the two in WIP inventory). Now if the same part was processed in batches of three, one could carry inventory fluctuating between $452 (3 pieces in finished goods plus 0 pieces in WIP at $380 fixed charges plus $72 variable charges) and $521 ($151 for the one piece remaining in finished goods plus $370 for the 3 piece batch two weeks out in WIP). Again, this is an example where the amount of money tied up in total inventory is higher under Lean's flow manufacturing than under batch processing.

Lean Thinking single piece flow can work extraordinarily well in some industries. Additionally, even where single piece flow is impractical, other aspects of Lean Thinking can save money. Suppose the same example above is used to examine flow within the machine shop. One person could set-up one machine, run the parts, and then stage them at the next machine. Then another machinist would set-up that machine, run the parts, and prepare them for the next machine, and so on. This is not very efficient. However, Lean would suggest that if you had the machines close together, two operators might be able to set-up all the machines. They then could run the parts by work centering and "flowing" piece by piece across the six machines. This is also a real example, and shows how Lean Thinking can work to save companies money by continuously improving the process.

Lean Thinking does not work well in other industries. The seminal question is often, what lot size is the right size? This is not adequately addressed by Lean Thinking and the prior art.

SUMMARY OF THE INVENTION

The present invention has been developed in response to the present state of the art, and in particular, in response to the problems and needs in the art that have not yet been fully solved by currently available approaches. Accordingly, the present invention has been developed to provide a novel method of optimizing an inventory lot size that at least includes: a) determining fixed and variable costs associated with a given lot size; b) determining a sale price associated with the given lot size; c) determining a profit margin (PM) based on the results in a) and b); d) determining an average inventory level (AIL); e) determining a cost of carrying inventory (CCI) associated with the given lot size; f) determining a net present value (NPV) based on a predetermined mathematical relationship between the determined PM, AIL and CCI; g) determining NPV changes ($\Delta$NPV) with incremental changes in lot size; and h) determining an optimal lot size based on the results in g).

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
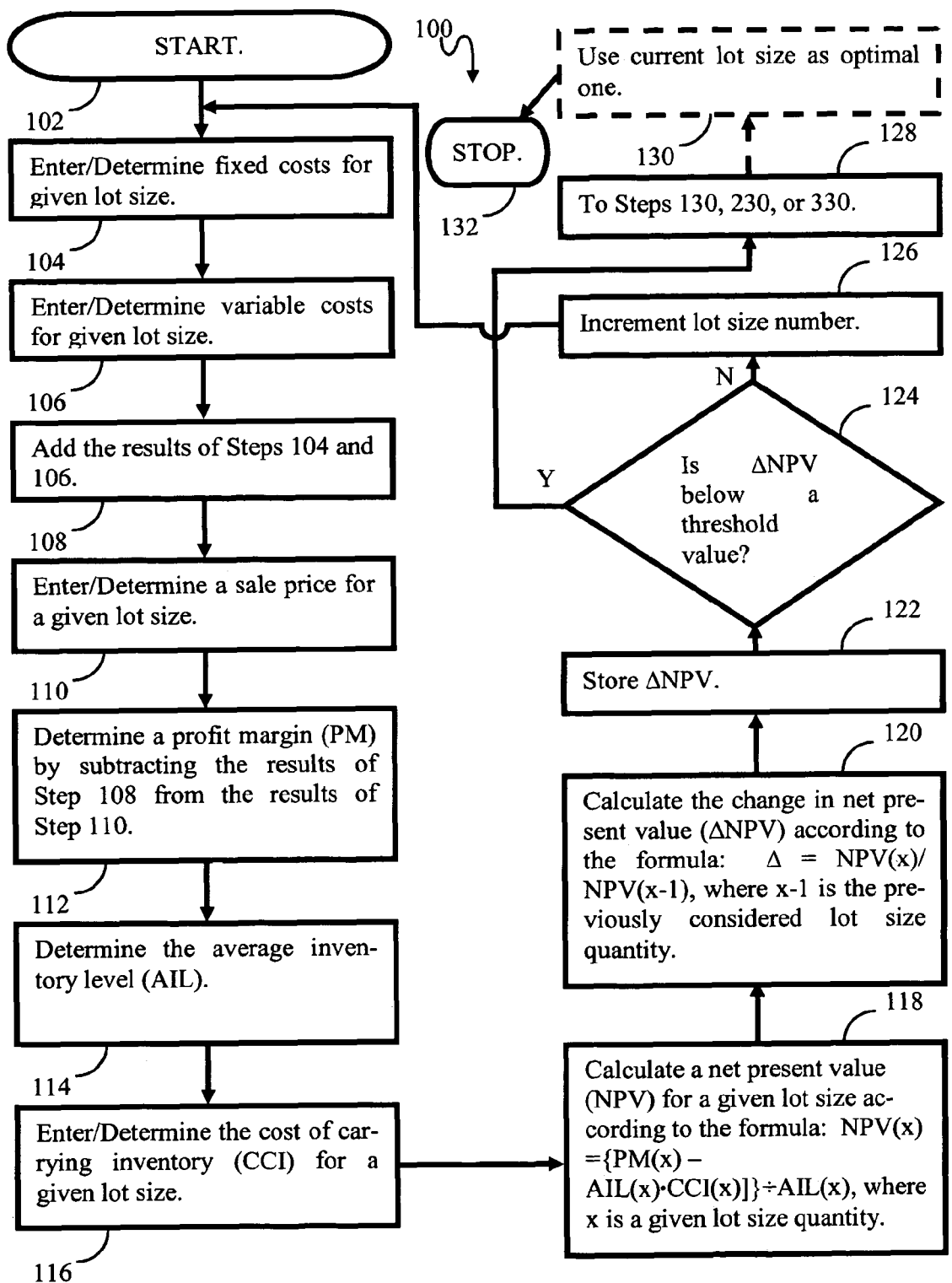
FIG. 1 is a flowchart illustrating the present-inventive method for optimizing inventory lot sizes.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment.

The answer to the Background section question of the optimal lot size does not lie in supply chain theories of big lot sizes, flow manufacturing, or optimal efficiencies, but rather in the mathematics of the funds tied up in inventory. Why invest $100,000 in a new piece of equipment that gives a 20% return on the investment when $100,000 in inventory would give a 100% return over the same time period? Why invest money in a project that takes five years to pay itself off, when the same money invested in inventory could pay itself off in two years? To determine where to invest money, many companies use the Net Present Value formula or the Payback model. This usually is associated with special projects, but it can be applied to inventories. What prevents companies from looking at inventories as monetary investment with the same criteria as is used to evaluate other investments? There are a few problems but they are not insurmountable.

First, one must recognize that there is a price to be paid for carrying inventory. The funds that are tied up in inventory could be invested elsewhere earning their own rate of return. Additionally, some inventory carries the risks obsolescence, damage, or pilferage. This cost of carrying inventory is real and must be factored into the decision making process. Determining the exact cost of carrying inventory is nearly impossible, but one can get pretty close. One also must look at how the different quantities involved in lot sizing affect the actual cost of goods carried in inventory. As noted in the example of the vane, the real cost of inventory is not the $200 each for which the vanes are sold, but the amount of funds invested into making the parts and putting them into inventory. In the example of running one piece at a time, the single vane in inventory is worth $414 that the company might have used elsewhere. In contrast, the second example (see the Background section) has the same vane and costs only $56.50 each in inventory.

The present invention proposes to use the following equation as part of the process for determining the optimal inventory lot size:

$$NPV(x) = \{PM(x) - [AIL(x)*CCI(x)]\}/AIL(x) \qquad \text{Equation 1}$$

where NPV(x) represents the Net Present Value of the given lot size, PM(x) represents the profit margin of the given lot size, AIL(x) represents the average inventory level in annual dollars, and CCI(x) represents the cost of carrying inventory for the given lot size.

The profit margin is calculated by first determining the cost of the part, which is the sum of fixed costs and variable costs, and then by finding the difference between the sale price and the cost of the part. This can be calculated with a spreadsheet.

Next, the average inventory level AIL for a given lot size is determined. Again, determining this information could be quite difficult to do without the aid of modern spreadsheets. However, the same information can be gathered repeatedly and easily by setting up an advanced spreadsheet. Because the formula relies on knowing when the next batch would arrive, only spreadsheets that can implement advanced formulas could perform this function repeatedly for different quantities. Spreadsheets having a Look-Up capability or the like are preferred, such as that in more recent versions of Corel's QuatroPro. For this example, a quarterly lot size is used. Because the Average Inventory Level (AIL) draws on some of the same information used on the Profit Margin spreadsheet, it can be gathered on the same workbook. One can either use the same spreadsheet or a different tab on the same workbook.

The last element is the Cost of Carrying Inventory for a given lot size. Again a spreadsheet is a useful tool for making this calculation. However, a discussion on the cost of carrying inventory is first warranted.

The cost of carrying inventory is not an exact science. It varies greatly from business to business, and, sometimes even from part to part. It is the number attached to potential lost dollars by carrying a given level of inventory. Sometimes, the risk of obsolescence is very high, such as with perishable foodstuffs. Sometimes the risk of obsolescence is quite low, such as with a commodity like glass. Either way, a calculation for this risk should be included in the formula. Because aircraft parts are always improving, but seldom determined to be obsolete, a very low risk factor of 0.01% or a one in a ten thousand chance that the part in the inventory will be declared obsolete can be used. There are also costs associated with more inventory, such as floor space, warehouse personnel requirements, and risks for damage. Most businesses already have some way to calculate this cost. It generally is listed as a percent of the inventory itself. Again, it is not an exact science. Sometimes, larger inventories are actually cheaper because of the labor requirements are less for less frequent turns of inventory. One must factor in the benefit of carrying inventory. Many companies have reduced inventories to nearly zero, only to find that it costs them in terms of lost sales. Sometimes a sale is only possible if sufficient quantities are already on hand to support an immediate delivery (yet another issue at odds with Lean thinking). Also, the cost for shipping ten small lots can be significantly more expensive than shipping two large lots. As one can see, the precise cost of carrying inventory is quite debatable and sometimes causes heated discussion among supply chain managers and accountants.

It is also important to note that since the cost of capital is already being considered in Net Present Value, it must not be double-counted by applying it again to the cost of carrying inventory. Net Present Value formulas should always have the cost of capital as a contributing factor in determining the Net Present Value goal. Frequently, companies use a NPV formula with a 20% rate of return. Factored into the 20% return is the weighted average cost of capital (WACC). With this in mind, do not also discount the cost of carrying inventory by the cost of capital. For the cost of carrying inventory, the third tab of the Workbook is used in the example. The reality is that the Cost of Carrying Inventory is not nearly as high as factored into the equation for some businesses. The total Cost of Carrying Inventory (CCI) risk factors are added up and multiplied by the inventory level of any given quantity (x).

There are some weaknesses in this formula if it is merely left as is. For instance, if a company made greater than the required NPV on any sized lot, than one could argue for nearly any lot size. Similarly, if a company lost money on the part no matter what lot size was selected, it could again be argued as to which lot size is optimal. However, the formula is best for evaluating the incremental change (delta) in NPV. In other words, what is really of interest is the delta of Net Present Value as one increases or decreases the lot size by one unit. The formula for this is:

$$\Delta = \frac{NPV(x)}{NPV(x-1)} = \frac{\{PM(x) - [AIL(x) * CCI(x)]\}/AIL(x)}{\{PM(x-1) - [AIL(x-1) * CCI(x-1)]\}/AIL(x-1)}$$ Equation 2

Equation 2 can be used in two possible ways, depending on the management theory of the company. One method would be to accept any increased lot size while the $\Delta$ is greater than 1. This result is for any positive increase to the bottom line (per unit) of a company resulting from an increased lot size. Another method would be to let the $\Delta$ value serve as the NPV decision maker. In other words, a company that selected a NPV of 1.2 for payback on an investment would then accept increases in lot size until the $\Delta$ was no longer 1.2 or higher. This latter method would be the method of choice for companies that want to keep inventories low as a matter of policy.

This is the great strength of this formula over the blanket generalities of Lean Thinking. Lean Thinking seeks to minimize lot sizes and aim for the goal of single piece flow. This is a good goal, but has no scientifically sound method to evaluate the effects on a company bottom line. This formula is not meant to be a counter to Lean, but rather it is a compliment to it. It recognizes the reality of the current state and evaluates how to maximize profits concurrently with Lean process improvements. Managers no longer have to guess what lot size is most cost effective. This formula can be used to determine the correct lot size.

To finish the process of determining the optimal inventory lot size, a user merely charts inventory lot sizes in conjunction with his or her return on inventory goals (from a graph generated by the spreadsheet). For a 25% return, for example, the user can observe where the line intercepts lot size, and then visually determine the exact optimal inventory lot size. Alternatively, the user may employ an adapted formula that is based on a payback model. If the goal is four years to payback, for example, then the user looks for the intercept on the graph at the 4 year level to determine the exact lot size. These results can also be presented numerically by the spreadsheet.

FIG. 1 shows a flowchart for implementing the present-inventive algorithm 100 for choosing an optimal inventory lot size. Along with other steps, the algorithm 106 iteratively makes calculations from Equations 1 and 2. The algorithm 100 is designed to be implemented in the form of a spreadsheet or database logic (software).

The algorithm 100 begins at Step 102, followed by Step 104, where the user enters the fixed costs for the items comprising a given lot size. Alternatively, the costs can be determined from previously stored information and calculations as a matter of design choice. Variable costs for the given lot size are entered or calculated in Step 106. Next, the fixed and variable costs are added in Step 108.

In Step 110, the sale price of the items in the given lot size are entered or calculated. A profit margin (PM) is calculated by subtracting the sum of the fixed and variable costs from the sales price (Step 112).

Next, the average inventory level (AIL) is entered or calculated in Step 114. This is followed by entry or calculation of the cost of carrying inventory (CCI) for the given lot size (Step 116). Using the previously entered or calculated information, the algorithm 100 calculates a net present value (NPV) for the given lot size according to Equation 1 (Step 118).

Following the calculation of the net present value, a quantity representing a change in the net present value ($\Delta$NPV) is calculated according to Equation 2 (Step 120). Recall that this is a ratio of the NPV calculated for a current iteration of the algorithm to the net present value calculated for the previous iteration of the algorithm. The change in net present value is also stored in Step 122.

The next step (124) determines whether to start a new iteration (at Step 104), or more toward the end of processing (i.e., determining the optimal lot size). In the preferred embodiment, a new iteration begins so long as the change is not below a predefined threshold value. The threshold value (e.g., 1.2) may be entered. Alternatively, a new iteration can be triggered so long as the change of net present value is greater than or equal to 1. A new iteration begins by performing Step 126 to increment the lot size number, followed by a return to Step 104.

When no further iterations are required, the algorithm jumps from Step 124 to Step 128. The algorithm 100 either next performs Step 130, Step 230 in an algorithm 200 (described infra.), or Step 330 in an algorithm 300 (also described infra.), as a matter of design choice.

If the algorithm advances to Step 130, the current lot size is determined to be the optimal one. The algorithm 100 ends in Step 132.

Figure 2:
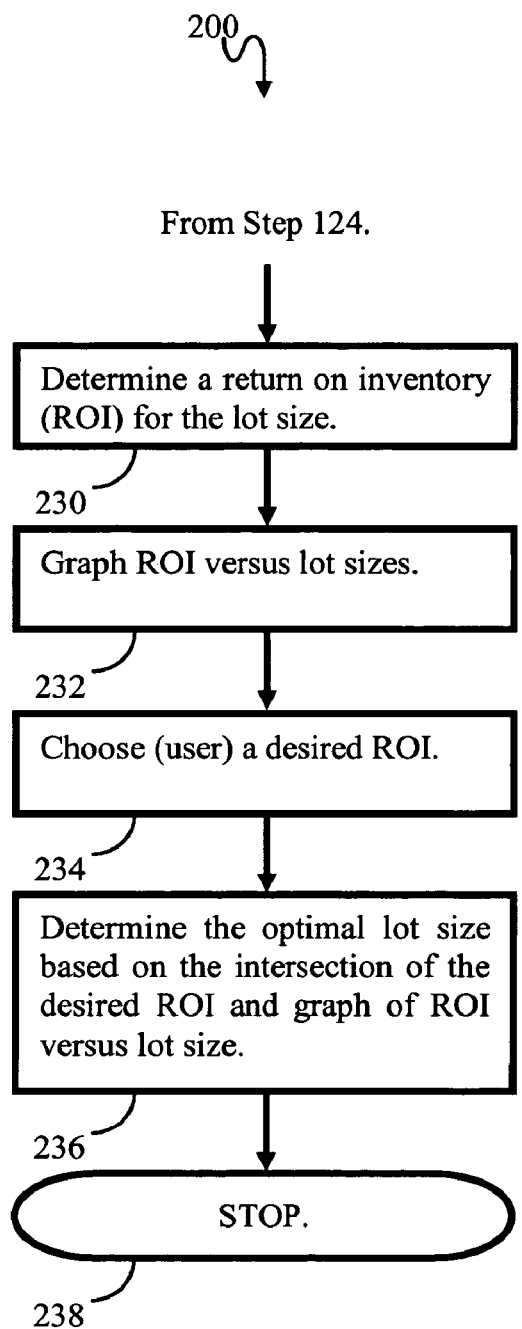
FIG. 2 is a flowchart illustrating a graphical method used to choose optimal inventory lot sizes based upon a desired return on inventory.

The algorithm 200 of FIG. 2 is a graphical method for choosing the optimal inventory lot size. The first step is to determine the return on inventory (ROI) for each lot size considered (Step 230). A visual graph of return on inventory versus inventory lot sizes is made in Step 232. The optimal lot size is chosen by the user by first identifying a desirable return on inventory, and then finding the intersection of the chosen return on inventory with the graph to select the optimal lot size (Steps 234 and 236). The algorithm 200 stops at Step 238.

Figure 3:
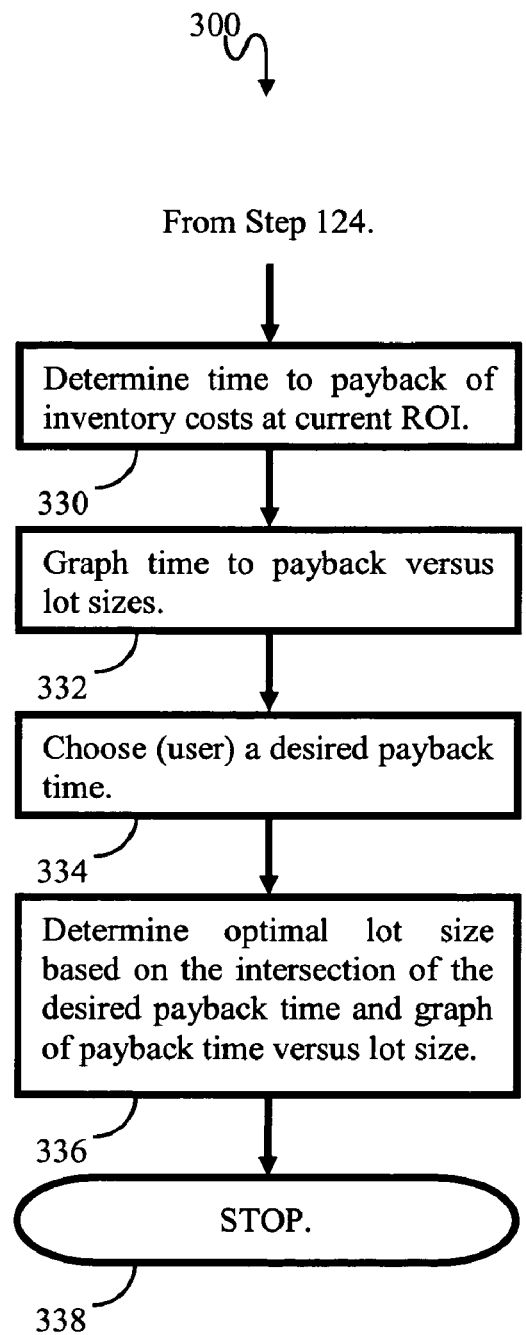
FIG. 3 is a flowchart illustrating a graphical method used to choose optimal inventory lot sizes based upon a desired period for payback of inventory costs.

Another option for determining the optimal inventory lot size is carried out via the algorithm 300 of FIG. 3. In the algorithm 300, the lot size is based upon the time estimated to pay back the costs of the inventory lot items using a selected return on inventory. The time to pay back the inventory costs for a given lot is determined in Step 330. The payback times are graphed versus the lot sizes in Step 332. The user can then select a desired payback time (Step 334), and graphically choose the optimal lot size (Step 336). The algorithm steps at Step 338.

It is understood that the above-described preferred embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

It is expected that there could be numerous variations of the design of this invention.

Finally, it is envisioned that the components of the device may be constructed of a variety of materials.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

For example, the present invention may be incorporated in Distribution Resource Planning (DRP) systems in general, and decision-making modules of DRP software in particular. The present invention may also be incorporated in Manufacturing Requirements Planning (MRP) software.

What is claimed is:

1. A method of optimizing an inventory lot size wherein a computer-readable medium storing a program that when executed, causes a computer to perform steps adapted to optimize inventory lot size, comprising:
    a) determining fixed and variable costs associated with a given lot size;
    b) determining a sale price associated with said given lot size;
    c) determining a profit margin (PM) based on the results in a) and b);
    d) determining an average inventory level (AIL) through calculation on a computer;
    e) determining a cost of carrying inventory (CCI) associated with said given lot size;
    f) determining a net present value (NPV) based on a predetermined mathematical relationship between the determined PM, AIL and CCI;
    g) determining NPV changes ($\Delta$NPV) with incremental changes in lot size; and
    h) determining an optimal lot size based on the results in g).

2. The method of claim 1, wherein element g) is determined by dividing an NPV associated with a given lot size, by an NPV associated with an incrementally reduced lot size.

3. The method of claim 1, wherein element h) further comprises:
    choosing as the optimal lot size, the lot size considered prior to a lot size producing a negative $\Delta$NPV, and wherein the NPV is calculated according to the following formula: $NPV(x) = \{PM(x) - [AIL(x)*CCI(x)]\}/AIL(x)$.

4. The method of claim 1, wherein element h) further comprises:
    choosing as the optimal lot size, the lot size considered prior to a lot size producing an $\Delta$NPV below a predetermined threshold.

5. The method of claim 1, wherein element f) further comprises:
    i) subtracting the product of the AIL and CCI from the PM; and
    j) dividing the result produced by i), by the AIL.

6. The method of claim 1, further comprising:
    i) determining for each given lot size, a return on inventory (ROI);
    j) choosing a desirable ROI; and
    k) determining as the optimal lot size, the lot size most closely associated with the chosen ROI.

7. The method of claim 6, further comprising:
    plotting the results of element i) on a graph; and
    carrying out element k) by interpreting said graph.

8. The method of claim 1, wherein the elements of said method are carried out with the aid of spreadsheet software.

9. A computer program adapted to optimize an inventory lot size having a computer-readable medium storing the program that when executed causes the computer to perform a a method of inventory lot size optimization, said program comprising the following executable steps:
    a) determining fixed and variable costs associated with a given lot size;
    b) determining a sale price associated with said given lot size;
    c) determining a profit margin (PM) based on the results in a) and b);
    d) determining an average inventory level (AIL) through calculation on a computer;
    e) determining a cost of carrying inventory (CCI) associated with said given lot size;
    f) determining a net present value (NPV) based on a predetermined mathematical relationship between the determined PM, AIL and CCI;
    g) determining NPV changes ($\Delta$NPV) with incremental changes in lot size; and
    h) determining an optimal lot size based on the results in g).

10. The computer program of claim 9, wherein element g) is determined by dividing an NPV associated with a given lot size, by an NPV associated with an incrementally reduced lot size.

11. The computer program of claim 9, wherein element h) further comprises:
    choosing as the optimal lot size, the lot size considered prior to a lot size producing a negative $\Delta$NPV.

12. The computer program of claim 9, wherein element h) further comprises:
    choosing as the optimal lot size, the lot size considered prior to a lot size producing an $\Delta$NPV below a predetermined threshold.

13. The computer program of claim 9, wherein element f) further comprises:

i) subtracting the product of the AIL and CCI from the PM; and
j) dividing the result produced by i), by the AIL.

14. The computer program of claim 9, further comprising:
i) determining for each given lot size, a return on inventory (ROI);
j) choosing a desirable ROI; and
k) determining as the optimal lot size, the lot size most closely associated with the chosen ROI.

15. The computer program of claim 14, further comprising: plotting the results of element i) on a graph; and carrying out element k) by interpreting said graph.

16. The computer program of claim 9, wherein the elements of said method are carried out with the aid of spreadsheet software.

* * * * *